United States Patent
Knudsen et al.

(10) Patent No.: US 7,267,803 B2
(45) Date of Patent: Sep. 11, 2007

(54) DEGASSING APPARATUS

(75) Inventors: Karin H Knudsen, Porsgrunn (NO); Willy Wilhelmsen, Langesund (NO); Hans Narvestad, Stathelle (NO); Odd J. Vardal, Skien (NO); Ingrid S. Melaaen, Porsgrunn (NO)

(73) Assignee: Borealis Technology Oy, Porvoo (FI)

( * ) Notice: Subject to any disclaimer, the term of this patent is extended or adjusted under 35 U.S.C. 154(b) by 670 days.

(21) Appl. No.: 10/311,619

(22) PCT Filed: Jun. 19, 2001

(86) PCT No.: PCT/GB01/02703

§ 371 (c)(1),
(2), (4) Date: Dec. 19, 2002

(87) PCT Pub. No.: WO01/97940

PCT Pub. Date: Dec. 27, 2001

(65) Prior Publication Data

US 2003/0156999 A1   Aug. 21, 2003

(30) Foreign Application Priority Data

Jun. 19, 2000   (GB) .................................. 0014972.4

(51) Int. Cl.
  *B01J 19/00* (2006.01)
  *B01D 47/00* (2006.01)
(52) U.S. Cl. ....................... 422/131; 422/232; 422/238; 96/376; 55/482; 95/37; 95/285; 95/287
(58) Field of Classification Search ................ 422/198, 422/232, 131, 238; 96/101, 376; 55/482, 55/342, 350.1, 466; 95/37, 285, 287
See application file for complete search history.

(56) References Cited

U.S. PATENT DOCUMENTS

| | | | | |
|---|---|---|---|---|
| 3,541,764 | A | | 11/1970 | Astrom ........................ 55/302 |
| 3,941,664 | A | * | 3/1976 | Scoggin ........................ 203/1 |
| 4,395,523 | A | * | 7/1983 | Kirch .......................... 526/64 |
| 4,620,024 | A | | 10/1986 | Davis et al. ................ 558/113 |
| 4,855,524 | A | * | 8/1989 | Harandi et al. ............ 585/517 |
| 4,923,068 | A | * | 5/1990 | Crowson ................... 210/741 |
| 4,953,694 | A | | 9/1990 | Hayashi et al. ............ 202/180 |
| 5,994,147 | A | * | 11/1999 | Rodriguez et al. ......... 436/163 |
| 6,045,661 | A | | 4/2000 | Kreischer et al. ............ 203/73 |
| 6,262,294 | B1 | * | 7/2001 | Sako et al. ................... 560/78 |
| 6,566,460 | B1 | * | 5/2003 | Salmon ....................... 526/64 |

FOREIGN PATENT DOCUMENTS

| | | |
|---|---|---|
| EP | 226216 A3 | 6/1987 |
| GB | 874 802 A | 8/1961 |
| JP | 5953507 | 3/1984 |
| WO | WO93/13845 | 7/1993 |
| WO | WO99/16540 | 4/1999 |

* cited by examiner

*Primary Examiner*—N. Bhat
(74) *Attorney, Agent, or Firm*—Nixon & Vanderhye P.C.

(57) ABSTRACT

A degassing apparatus for use with a polymerisation reactor is disclosed. Slurry from the reactor is discharged into a flask tank (3) in which monomers or dilluent vaporise to form a gas. Filler units (9, 10) are provided at the upper part of the flash tank (3). They may be selectively connected to the flash tank by valves (11, 12). No cyclone etc. is provided between the flash tank and the filter (9, 10) and these particles may then fall back into the flash tank (3). The filters may be separately isolated for cleaning or replacement.

12 Claims, 3 Drawing Sheets

DEGASSING APPARATUS

CROSS REFERENCE TO RELATED APPLICATION

This application is the U.S. national phase of international application PCT/GB01/02703 filed 19 Jun. 2001, which designated the U.S.

The present invention relates to a degassing apparatus for use with polymerisation reactors, for example for use in making polyethylene.

BACKGROUND OF THE INVENTION

Polyethylene is typically manufactured according to the Phillips process in a slurry system. In this system high purity ethylene is fed to a loop reactor. A low boiling point hydrocarbon such as isobutane is used to dissolve the ethylene monomer and to suspend catalyst and polymer particles within the reactor. Ethylene gas, the dilluent and powdered catalyst are fed continuously into the loop reactor in which the contents are rapidly circulated by means of a pump. The reactor is typically maintained at a temperature of the order of 100° C. and a pressure of the order of 4 MPa. As the process continues, polymer particles start to form and the larger ones precipitate and enter a settling zone from which concentrated slurry is discharged. The production system is continuous such that the product is removed at the same rate at which it forms.

Because of the high pressure within the reactor it will be appreciated that the discharged slurry contains ethylene which it is desirable to recycle in order to avoid waste. The polymer must also be separated from other materials. The slurry is therefore supplied from the loop reactor to a so-called flash tank or flash drum which is maintained at a much lower pressure than the reactor. This results in the ethylene and low boiling point dilluent flash-vaporising overhead. The monomer gas and the dilluent is then transferred to a compressor and reused.

However, it is necessary to purify this "flash gas", and in particular to remove small particles known as "fines" therefrom as these could damage the compressor. For this reason the vapour is passed firstly to a cyclone and from there to a bag filter. Both the cyclone and the bag filter are connected to collection tanks known as "drop out pots" which collect solid matter. This matter is then fed via rotating valves (which prevent gas flowing therethrough) to a dryer called a "fluff dryer" along with the slurry from the flash tank. The purified gas is then fed via a so-called guard filter to the flash gas compressor. The guard filter is intended merely to protect the compressor in the event of a failure elsewhere in the system.

The fluff dryer dries the matter fed to it to leave polymer powder. Additives are added if required and the powder is then sent on to an extruder in which it is melted and formed into pellets.

The system described above is satisfactory in most circumstances. Over a period of time, the filters, which are typically bag filters, become blocked and the process must be shut down so that these may be cleaned or replaced. Normally, this is not a serious problem because this maintenance is only required infrequently.

However, it has been found that in certain circumstances the filter and sometimes the cyclone clog up after only a short period of time. It has been found that this occurs when polymer having a high comonomer (such as 1-hexene and 1-octene) content is being produced. Hexene may be added to the olefin feed in order to control density of the polymer and it is believed that condensed hexene and oligomers make the overall product sticky. This in turn causes rapid clogging of the cyclone and bag filter. Comonomer 1-hexene also wets the filters which increases this clogging. It is thought that the higher hexene content results in lower temperatures which in turn create an increased amount of condensation which clogs the filter and cyclone.

As a consequence of this, it is only possible to have comparatively short production runs of high hexene content polymers with a practical limit of around 2000 tons. After this, low hexene content products have to be produced in order to clean the cyclone and bag filter. It will be appreciated that this is a serious problem if large volumes of high hexene content product are to be produced.

DESCRIPTION OF THE INVENTION

Figure 1:
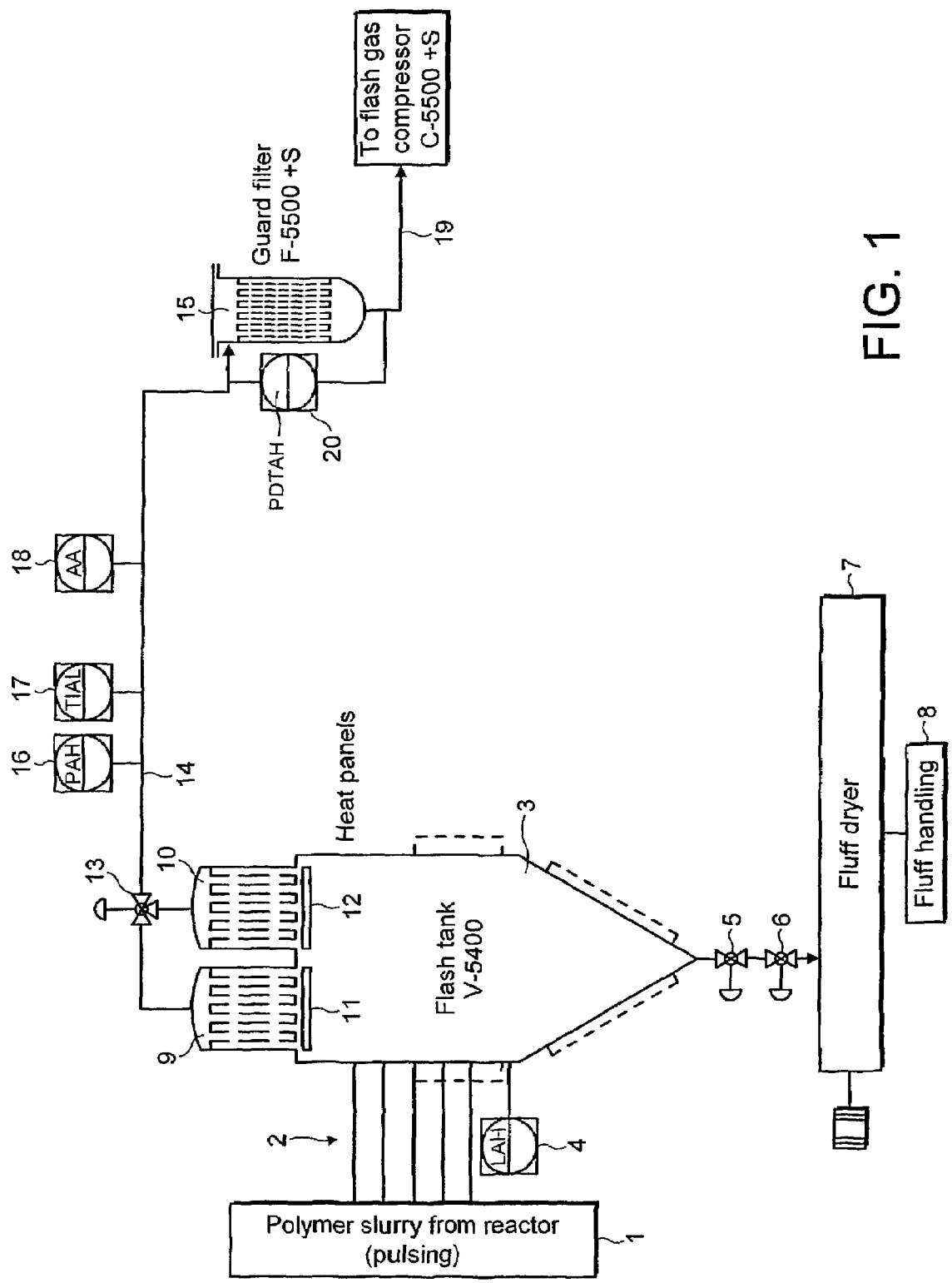
FIG. 1 is an overview of the degassing apparatus of a first embodiment of the present invention.

According to one aspect of the invention there is provided a degassing apparatus for use in association with a polymerisation reactor, the apparatus comprising a flash tank into which slurry from the reactor may be discharged and within which monomer(s) and/or dilluent in the slurry may be vaporised to form gas; and a filter unit for removing suspended particles from the gas; wherein the filter unit is directly connected to the flash tank without an intervening cyclone or the like.

Thus, in contrast to the conventional arrangement, the cyclone located between the flash tank and the filter has been eliminated. Conventionally it was believed that the presence of a cyclone was essential in order to prevent excessive liquid or solid matter reaching the filter and thereby causing the filter to clog. However, the inventors have found that, surprisingly, improved operation is achieved, at least when producing high hexene content polymers, by feeding the flashed material directly to a filter unit. This maintains a high temperature and thereby prevents, or at least reduces, clogging of the filters. It will also be appreciated that this arrangement results in a significantly reduced component count, shorter piping runs and a generally simpler arrangement.

As discussed, this arrangement is advantageous in itself since by reducing clogging the need to shut down the system in order to clean or replace filters is reduced. However, the above described arrangement lends itself to a particular further advance over the prior art system whereby there may be provided a plurality of filter units each directly connected to the flash tank. Valve apparatus may then be provided such that one of the filter units may be isolated for cleaning, removal or replacement whilst the other filter(s) remain in operation. In the present context "valve apparatus" means any appropriate flow controlling apparatus. Thus, the apparatus may be designed to operate using one or the other of the filter units at any one time, or it may be arranged to use both filters during normal operation with the option of isolating one or more of the filters for maintenance.

It will be appreciated that the filter units are preferably located as close as possible to the flash tank in order to keep the pipe runs to a minimum in order to reduce temperature drop. Each filter unit may be provided with a conduit to direct solid matter therefrom to a dryer which may be the same dryer to which material is directed from the flash tank. However, in one embodiment the filter unit(s) is/are mounted at an upper part of the flash tank and are arranged such that particles thereby removed from the gas may fall into the flash tank itself. They then pass into the dryer along with solid matter from the tank.

This arrangement is in itself regarded as providing an invention and therefore from another aspect the invention provides a degassing apparatus for use in association with the polymerisation reactor, the apparatus comprising: a flash tank into which slurry from the reactor may be discharged and within which monomer(s) and/or dilluent in the slurry may be vaporised to form gas; and a filter unit for removing suspended particles from the gas; wherein the filter is mounted at an upper part of the flash tank and is arranged such that particles thereby removed from the gas may fall into the flash tank.

It will be appreciated that this arrangement is particularly advantageous in that it maintains the temperature in the region of the filters, thereby reducing the clogging problem, and greatly simplifies the structure and reduces the component count.

The filters may be mounted on top of the flash tank with suitable conduits which must be of a suitable diameter to enable matter to fall back into the flash tank in use against a flow of gas into the filters. Alternatively, the filter unit(s) may be formed integrally with the flash tank itself as a single structure.

As previously discussed, a plurality of filter units may be provided and they may be arranged such that one or more may be isolated for maintenance, cleaning of filter materials, replacement etc. This applies equally whether the filters are integral with the flash tank or separate therefrom.

This arrangement is also regarded as being inventive in its own right and therefore viewed from a further aspect the present invention provides a degassing apparatus for use in association with a polymerisation reactor, the apparatus comprising a flash tank into which slurry from the reactor may be discharged and within which monomer(s) and/or dilluent in the slurry may vaporise to form gas; and a plurality of filter units for removing suspended particles from the gas; whereby the filter units are arranged such that one of the filter units may be isolated for cleaning, removal or replacement whilst the other filter(s) remain in operation.

Although it is possible to use any conventional type of filter in this context, it is preferred that the filter units comprise bag filters.

Additionally or alternatively, the filter units may comprise sintered metal filters such as those available from Pall Corporation. These have the advantage that they can be cleaned, either in situ or after removal, by ultrasound, back flushing when above a certain pressure etc. If it is desired to clean the filters in situ by back flushing then appropriate pipework and valving would be provided to generate the necessary back flow.

Alternatively, if the filters are to be removed for cleaning then the sintered metal filters are particularly advantageous in that the material can be burnt off without damaging the filters.

Downstream of the filter unit(s) the apparatus of the invention may be entirely conventional and therefore there may be further provided a compressor for compressing the gas and a guard filter to protect the compressor from any particles not removed by the filter unit(s). Furthermore, there may be provided a dryer such as a fluff dryer and/or a purge dryer for drying solid matter separated from the vaporised gas in the flash tank and/or for receiving solid matter from the filter unit(s).

It will be appreciated that the invention also extends to a method of degassing a slurry from a polymerisation reactor comprising supplying the slurry to the apparatus as discussed previously and allowing the apparatus to degas the slurry in the manner described and subsequently separating the monomer gas and solid matter.

Furthermore, the invention extends to a method of producing a polymer whereby monomer, catalyst and other reactant(s) are supplied to a polymerisation reactor and the resultant slurry is supplied to a degassing apparatus as previously described whereby the polymer is separated from monomer gas. The polymer may then be sent as a powder to an extruder in which it is melted and formed into pellets.

Certain embodiments of the invention will now be described, by way of example only, and with reference to the accompanying drawings.

In the following description, the embodiments are similar except where the contrary is indicated.

Turning now to FIG. 1, the output from a polymerisation loop reactor is shown schematically at 1 with a number of conduits 2 leading into the flash tank. These carry slurry including polymer, unreacted monomer, dilluents and other material into the flash tank 3.

A high level alarm 4 is provided in connection with the flash drum to indicate whether an excessive quantity of solid matter has been fed into the tank. At the lower part of the tank valves 5 and 6 are provided to control the flow of solid matter therefrom into a conventional fluff dryer 7. The fluff dryer dries the slurry and produces polymer powder which is sent on to fluff handling schematically shown at 8. The dryer and handling apparatus is entirely conventional and will not be discussed further herein.

At the top of the flash tank a pair of filter units 9 and 10 are provided which may be isolated from the flash tank itself by means of slider valves 11 and 12 respectively. The filters each comprise a bag formed of woven polypropylene cloth on a supporting cage of the type supplied by Bethpulse SA. Complete systems are supplied by Hosokawa of Japan. A three-way selector valve 13 interconnects the outlets of the filter units and connects them to a conduit 14 which leads to guard filter 15. On the conduit are provided a high pressure alarm 16, a high temperature alarm 17 and an analyser 18. The analyser is a gas chromatograph which is used for identifying gas within the conduit 14.

Downstream of the guard filter is a further conduit 19 which leads to a flash gas compressor which is not shown. Again, this is a conventional component. A high pressure differential alarm 20 is provided across the guard filter. This detects an unusually high pressure drop across the guard filter which is indicative of matter clogging the guard filter. Since the guard filter is merely designed to protect the compressor, the presence of significant matter in the filter indicates a failure of the filter units 9 and 10 upstream.

In normal operation, one of the slide valves, for example valve 11 would be open with the other closed such that, in this example, filter unit 9 would be placed into communication with the flash drum and filter 10 would be isolated therefrom. Three-way valve 13 would be set to place filter unit 9 into communication with conduit 14 and to isolate filter unit 10 therefrom.

Slurry is introduced into the flash drum in the conventional manner. Since the flash drum is at a significantly lower pressure than the loop reactor (which would be at several MPa), the monomer gas and other low boiling point materials will flash vaporise leaving a concentrated slurry at the lower part of the flash tank. Valves 5 and 6 may be opened in order to extract this material which is subsequently dried in fluff dryer 7 and processed in the conventional manner.

The gas etc. flows up through open slider valve 11 and through filter 9 into conduit 14. The filtered gas then passes through guard filter 15 and into conduit 19 to the flash gas compressor.

Solid material which is filtered out of the gas stream by filter units 9 may fall back into the flash drum where it will join the concentrated solids, powder etc. and be removed as previously described.

It will be noted that in this embodiment the filter units which comprise essentially conventional bag filters are housed integrally with the flash tank. This means that the gas etc. flowing towards them remains at a high temperature with a result that there is much less condensation on the filters than occurs in the prior art arrangements. This prevents the clogging problem previously described and thereby extends the time period after which the filters must be cleaned or replaced.

When it is required to clean or replace the filters the filter in question is isolated and the other filter is connected into the flow. Thus, in the present example slider valve 12 may be opened, slider valve 11 closed and three-way valve 13 adjusted such that gas can flow from the flash drum 3 through filter 10 via valve 13 into conduit 14. In this configuration, the filter unit 9 is isolated from the gas flow path and may then be removed, inspected, replaced etc. It will be appreciated that this can be achieved without the need to interrupt operation of the plant.

Figure 2:
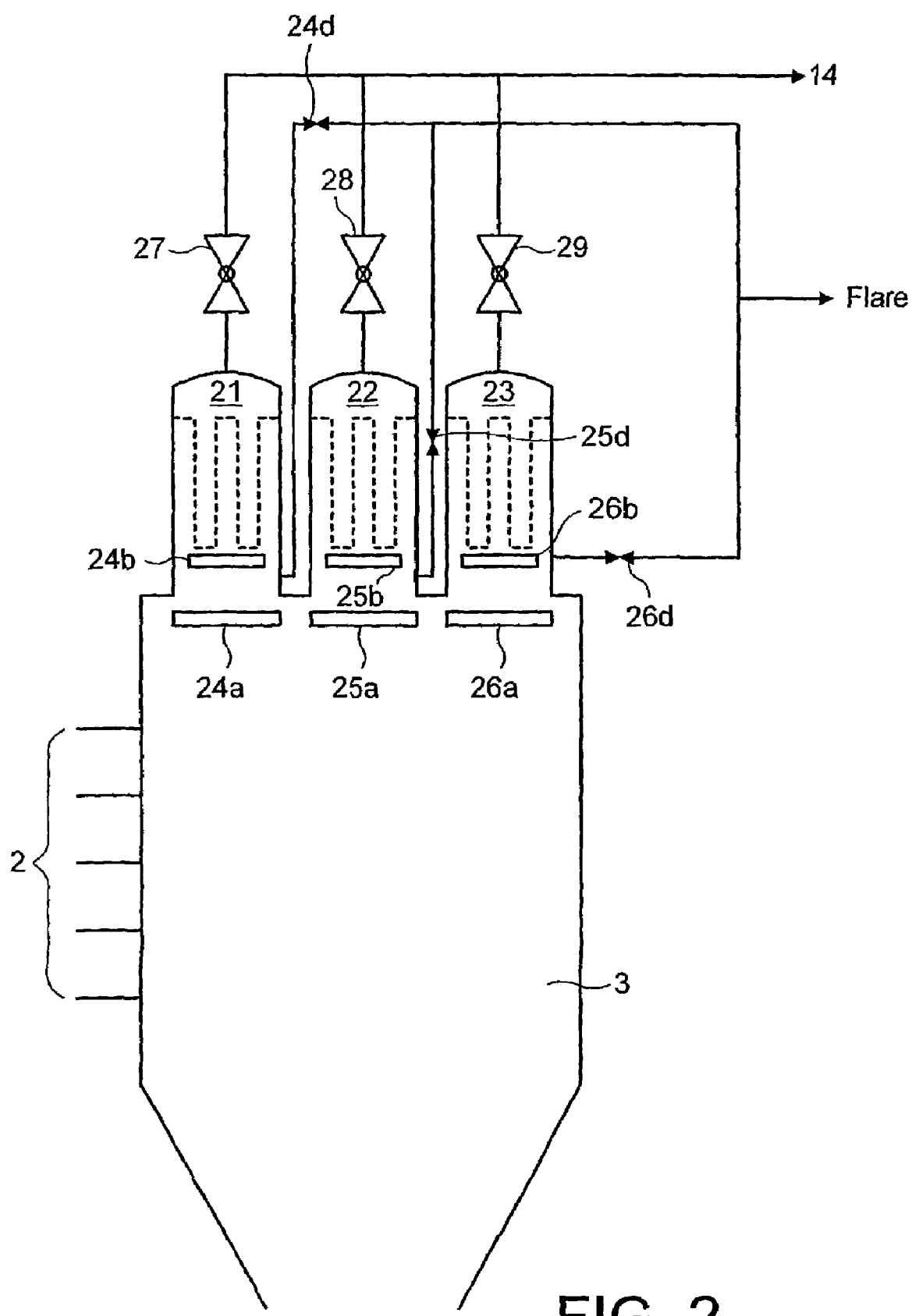
FIG. 2 is a portion of an embodiment which is a modification of the first embodiment.

FIG. 2 illustrates a modified version of the upper portion of the flash tank of FIG. 1 in which three filters units 21, 22 and 23 are provided together with pairs of slide valves 24a and b, 25a and b and 26a and b respectively. Between each of the valves of each pair an outlet conduit 24c, 25c, 26c is provided which leads via a valve 24d, 25d, 26d to a flare. This provides a double block and bleed arrangement enabling the space between the pairs of valves to be vented. Outlet valves 27, 28 and 29 respectively are also provided. The operation of this embodiment is as previously described, except that if desired, two filters can be used at any time with a third one being out of service for maintenance and that the valving arrangement enables each of them to be independently controlled.

Figure 3:
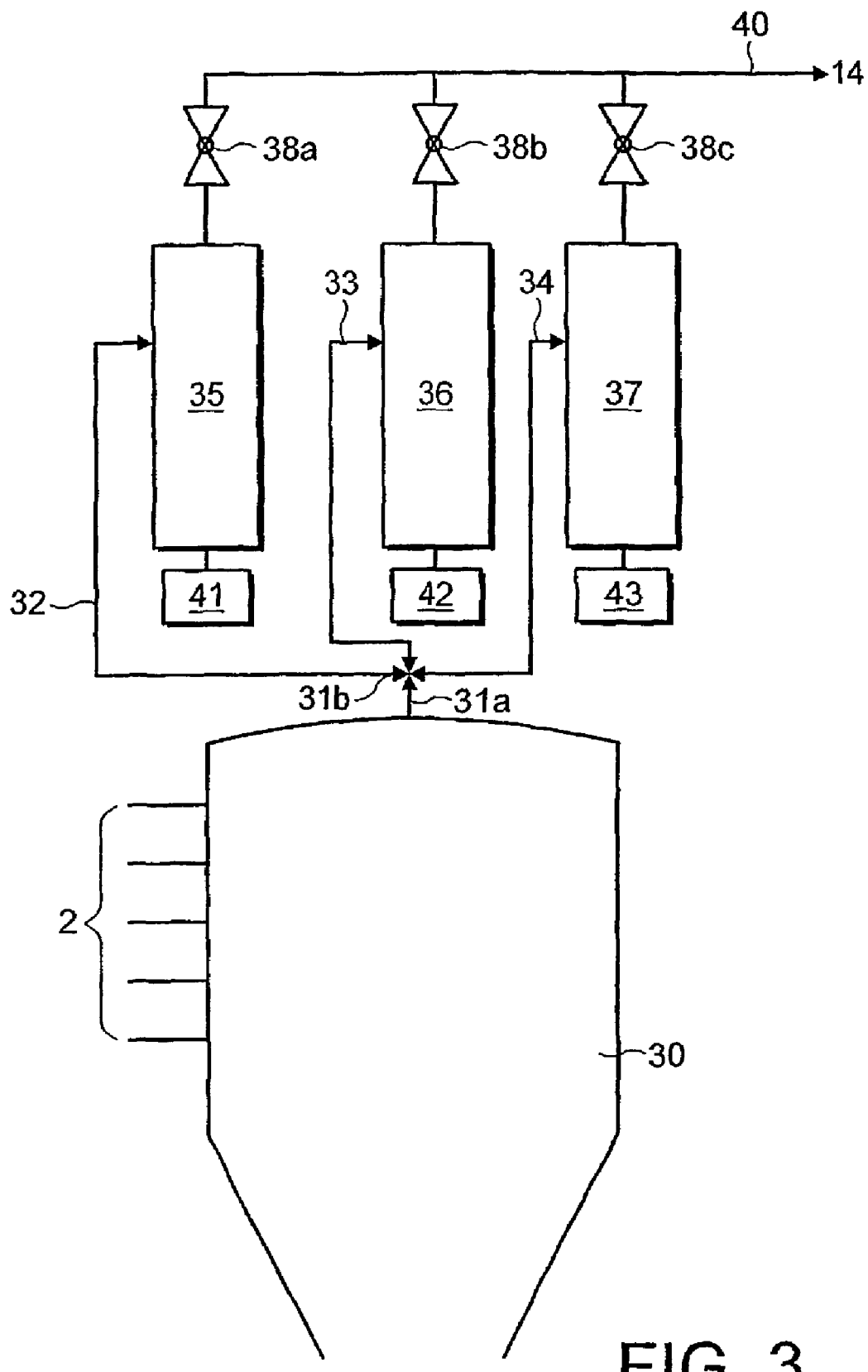
FIG. 3 is a corresponding portion of a further embodiment.

FIG. 3 illustrates a further embodiment of the invention which corresponds broadly to FIG. 1 again. Here three filter units are provided and these are separate from the flash tank 30 itself. Thus, the flash tank 30 has a conventional outlet 31a which leads via a valve 31b to three conduits 32, 33, 34 leading to separate filter units 35, 36 and 37. Outlets from each of the filters lead via valves 38a-c to a common conduit 40 which in turn leads to conduit 14 as shown in FIG. 1. The valves 31b and 38a-c are provided such that each filter may be independently placed in or out of service.

A further significant difference from the previously described embodiments is that the solid matter from the filter units is not directed back into flash tank 30. Rather, each filter unit has an outlet conduit for solid matter which in the present case is shown leading schematically to dryers 41, 42 and 43. However, in practice it would generally be more convenient for these conduits to lead to the main dryer.

In a modification of this embodiment, instead of being fed to dryers 41-43 or the main dryer, the polymer collected from the filters is fed back into the flash tank by means of a rotary feeder.

The arrangement of this embodiment may be advantageous over those previously described in certain circumstances. For example, whilst the filter units are directly connected to the flash tank 30 and only short lengths of conduit are needed for this interconnection, they are nevertheless separate units which may facilitate maintenance more easily. Furthermore, separating the solids outlet from the gas inlets avoids problems of filtered out solids being entrained in the inlet gas flow. A further advantage of the embodiment of FIG. 3 is that with suitable additional conduits (not shown) it is a simple matter to reverse the flow of gas through the filters which may be assist in cleaning or removing any blockages. On the other hand, the embodiments of FIGS. 1 and 2 are more appropriate where it is of greatest importance to maintain the filters of the higher temperature in order to avoid condensation problems.

In any of the embodiments, the filter units may use sintered metal filter material which is advantageous in that it can be readily cleaned and reused or can be removed and burnt off at a remote site.

The invention claimed is:

1. A degassing apparatus in association with a polymerisation reactor, the apparatus comprising:
   a) a flash tank into which slurry from the polymerisation reactor may be discharged and within which monomer(s) and/or diluent in the slurry may vaporise to form gas; and
   b) at least one filter unit for removing suspended particles from the gas; wherein
   c) the filter unit is directly connected to the flash tank without an intervening cyclone.

2. A degassing apparatus as claimed in claim 1 wherein there is provided a plurality of filter units directly connected to the flash tank.

3. A degassing apparatus as claimed in claim 2, wherein valve apparatus is provided such that one of the filter units may be isolated for cleaning, removal or replacement whilst other filter(s) remain in operation.

4. A degassing apparatus as claimed in claim 1 wherein the filter unit(s) is/are mounted at an upper part of the flash tank and is/are arranged such that particles thereby removed from the gas may fall into the flash tank.

5. A degassing apparatus for use in association with a polymerisation reactor, the apparatus comprising:
   a) a flash tank into which slurry from the polymerisation reactor may be discharged and within which monomer(s) and/or diluent in the slurry may vaporise to form gas; and
   b) a filter unit for removing suspended particles from the gas; wherein the filter unit is mounted at an upper part of the flash tank and is/are arranged such that particles thereby removed from the gas may fall into the flash tank.

6. A degassing apparatus as claimed in claim 1 wherein the filter unit(s) are formed integrally with the flash tank.

7. A degassing apparatus as claimed in claim 1 wherein the filter units comprise bag filters.

8. A degassing apparatus as claimed in claim 1 wherein the filter units comprise sintered metal filters.

9. A degassing apparatus as claimed in claim 1, further comprising a compressor for compressing the gas and a guard filter, situated between the filter unit(s) and the compressor, to protect the compressor from any particles not removed by the filter unit(s).

10. A degassing apparatus as claimed in claim 1 further comprising a dryer for drying solid matter separated from the vaporised gas in the flash tank and for receiving solid matter from the filter unit(s).

11. A method of degassing a slurry from a polymerisation reactor comprising supplying the slurry to the apparatus of claim 1, allowing the apparatus to degas the slurry and thereby separating monomer gas and/or diluent from solid matter.

12. A degassing apparatus in association with a polymerisation reactor, the apparatus comprising:
  a) a flash tank into which slurry from the polymerisation reactor may be discharged and within which monomer(s) and/or diluent in the slurry may vaporise to form gas; and
  b) a plurality of filter units for removing suspended particles from the gas;
  c) whereby the filter units are arranged such that one of the filter units may be isolated for cleaning, removal or replacement while other filter(s) remain in operation.

* * * * *